US012751875B2

(12) United States Patent
Xie et al.

(10) Patent No.: US 12,751,875 B2
(45) Date of Patent: Oct. 6, 2026

(54) RAISING AND LOWERING DEVICE FOR SMALL BED HEAD/FOOT FRAME

(71) Applicant: ANHUI LANGWEI MEDICAL DEVICE TECHNOLOGY CO., LTD., Mingguang City (CN)

(72) Inventors: Xiaosheng Xie, Mingguang City (CN); Caihong Wei, Mingguang City (CN)

(73) Assignee: ANHUI LANGWEI MEDICAL DEVICE TECHNOLOGY CO., LTD., Mingguang City (CN)

( * ) Notice: Subject to any disclaimer, the term of this patent is extended or adjusted under 35 U.S.C. 154(b) by 0 days.

(21) Appl. No.: 19/030,504

(22) Filed: Jan. 17, 2025

(65) Prior Publication Data

US 2026/0130808 A1 May 14, 2026

(30) Foreign Application Priority Data

Nov. 12, 2024 (CN) ......................... 202422749473.3

(51) Int. Cl.
*A61G 7/05* (2006.01)

(52) U.S. Cl.
CPC .................................. *A61G 7/0506* (2013.01)

(58) Field of Classification Search
CPC ...... A61G 7/002; A61G 7/012; A61G 7/0506; A61G 13/02; A61G 13/06; A61G 13/08; A47C 19/04; A47C 19/045
See application file for complete search history.

(56) References Cited

U.S. PATENT DOCUMENTS

| | | | | | |
|---|---|---|---|---|---|
| 1,799,692 | A * | 4/1931 | Knott | A61G 13/00 | 5/607 |
| 2,870,460 | A * | 1/1959 | Sanford | A61G 7/012 | 5/11 |
| 2,872,688 | A * | 2/1959 | Reichert | A61G 7/012 | 5/611 |
| 2,885,692 | A * | 5/1959 | Wetzel | A61G 7/012 | 5/610 |
| 3,015,113 | A * | 1/1962 | Wallen | A61G 7/005 | 5/11 |
| 3,045,256 | A * | 7/1962 | Scher | A61G 7/012 | 5/11 |
| 3,050,744 | A * | 8/1962 | Mann | A61G 7/012 | 5/11 |

(Continued)

FOREIGN PATENT DOCUMENTS

WO WO-2004037043 A2 * 5/2004 ........... A47C 19/045

*Primary Examiner* — David E Sosnowski

(57) ABSTRACT

A small bed head/foot frame raising and lowering device is provided, which includes a screw rod guide block, a sleeve pin and a mounting assembly; the sleeve pin is movably mounted on an outer side of the screw rod guide block, the mounting assembly is arranged on one side of the sleeve pin, and the entire raising and lowering device is mounted for raising and lowering operations by arranging the mounting assembly; the mounting assembly includes first springs, positioning tubes, a screw rod, a screw rod sleeve, a bed head/foot frame and a second spring, where the first springs are movably mounted at two ends of an inner side of the sleeve pin, the positioning tubes are fixedly mounted on two outer sides of the sleeve pin, and the screw rod is rotatably mounted under the sleeve pin.

7 Claims, 2 Drawing Sheets

(56) References Cited

U.S. PATENT DOCUMENTS

| | | | | | |
|---|---|---|---|---|---|
| 3,105,246 | A * | 10/1963 | Emrick | A61G 7/012 108/147 |
| 3,271,795 | A * | 9/1966 | Hillenbrand | A61G 7/012 5/611 |
| 3,281,872 | A * | 11/1966 | Dewey | A61G 7/012 5/611 |
| 3,628,199 | A * | 12/1971 | Helton | A61G 7/012 5/611 |
| 3,693,200 | A * | 9/1972 | Stafford | A61G 7/015 5/617 |
| 4,062,074 | A * | 12/1977 | Holland | A61G 7/005 5/607 |
| 4,101,990 | A * | 7/1978 | Holland | A61G 7/012 5/611 |
| 5,134,731 | A * | 8/1992 | Quintile | A47C 19/045 74/424.78 |
| 5,802,639 | A * | 9/1998 | Raasch | F16H 25/2015 5/616 |
| 6,272,853 | B1 * | 8/2001 | Broechmann | A47B 9/02 91/169 |
| 6,507,964 | B1 * | 1/2003 | Lewandowski | A61G 13/04 5/617 |
| 7,441,289 | B2 * | 10/2008 | Loewenthal | A47C 19/045 5/11 |
| 7,653,954 | B2 * | 2/2010 | Hornbach | A61G 7/015 5/11 |
| 9,084,493 | B2 * | 7/2015 | Serhan | A61G 7/012 |
| 9,883,750 | B2 * | 2/2018 | Yi | A47D 9/012 |
| 2002/0088052 | A1 * | 7/2002 | Vilsmeier | A47C 17/84 5/136 |
| 2003/0159215 | A1 * | 8/2003 | Shiery | B60B 33/0092 5/610 |
| 2004/0078894 | A1 * | 4/2004 | Snyder | A47C 19/045 5/11 |
| 2004/0148698 | A1 * | 8/2004 | Snyder | A47C 19/045 5/11 |
| 2004/0221386 | A1 * | 11/2004 | Loewenthal | A61G 7/012 5/11 |
| 2014/0159410 | A1 * | 6/2014 | Rasmussen | B60P 3/39 296/24.33 |
| 2017/0156955 | A1 * | 6/2017 | Yang | A61G 7/002 |

* cited by examiner

RAISING AND LOWERING DEVICE FOR SMALL BED HEAD/FOOT FRAME

CROSS-REFERENCE TO RELATED APPLICATION

This patent application claims the benefit and priority of Chinese Patent Application No. 2024227494733 filed with the China National Intellectual Property Administration on Nov. 12, 2024, the disclosure of which is incorporated by reference herein in its entirety as part of the present application.

TECHNICAL FIELD

The disclosure relates to the technical field of bed body raising and lowering, and in particular to a raising and lowering device for a small bed head/foot frame.

BACKGROUND

In the fields of medical treatment and nursing, raising and lowering devices for bed head/foot frames are important constituent parts of hospital beds and nursing beds. These devices are generally used for supporting the heads or legs of patients in order to provide comfortable postures or to meet specific medical needs. Conventional raising and lowering devices for bed head/foot frames are mostly operated manually and require caregivers to lift or lower bed head/foot frames with effort, which not only increases the labor intensity of the caregivers, but also may cause discomfort to the patients during the operation;

In the document of the prior art with application no. 201920963604.4, conventional bed head/foot frames use sliding blocks and bearing seats mostly machined by using metal parts and have many problems such as multiple assemblies, large machining difficulty, high costs, large-sized and complicated structures and large packaging difficulty; and most of the bearing seats are of single-shaft structures and have the problems such as short service life, high noise and unsmooth raising and lowering. Therefore, the disclosure provides a raising and lowering device for a small bed head/foot frame in order to solve the problems existing the prior art.

SUMMARY

In view of the above-mentioned problems, an object of the disclosure is to provide a raising and lowering device for a small bed head/foot frame. The raising and lowering device for a small bed head/foot frame aims to optimize the shortcomings of a conventional liftable head/foot frame, and an enterprise independently designs mold opening and replaces a conventional sliding block and a conventional bearing seat with plastic parts, to reduce costs, optimize a structure, reduce the mounting size of the bearing seat and keep the same width as a bed head frame without occupying an additional space. The bearing seat is revised to have a double-shaft structure, which rotates more smoothly and has lower noise and longer service life. The size of a first bevel gear and a second bevel gear are reduced after redesign, and a bearing is mounted in front and back of the second bevel gear respectively, such that the wear thereof can be reduced.

To achieve the object of the disclosure, the disclosure is implemented by the following technical solution. A raising and lowering device for a small bed head/foot frame includes a screw rod guide block, a sleeve pin and a mounting assembly; the sleeve pin is movably mounted on an outer side of the screw rod guide block, the mounting assembly is arranged on one side of the sleeve pin, and the entire raising and lowering device is mounted for raising and lowering operations by arranging the mounting assembly; the mounting assembly includes first springs, positioning tubes, a screw rod, a screw rod sleeve, a bed head/foot frame and a second spring, where the first springs are movably mounted at two ends of an inner side of the sleeve pin, the positioning tubes are fixedly mounted on two outer sides of the sleeve pin, and the screw rod is rotatably mounted under the sleeve pin and is arranged on an inner side of the positioning tubes; the screw rod sleeve is sleeved on a surface of the screw rod, the bed head/foot frame is arranged on one side of the screw rod sleeve, the screw rod passes through the inside of the bed head/foot frame to be mutually in sleeved connection with the screw rod sleeve, and the second spring is movably mounted inside the bed head/foot frame.

A further improvement lies in: a first bearing is movably mounted at the upper portion of an inner side of the bed head/foot frame, and first screws are fixedly mounted on two sides of the first bearing.

A further improvement lies in: a steel wire rope is movably arranged on the inner side of the bed head/foot frame, and the steel wire rope is provided at an internal snap groove in the bed head/foot frame.

A further improvement lies in: gear seat shells are moveably mounted on two sides of the lower portion of the inner side of the bed head/foot frame, a second bearing is arranged on inner sides of the gear seat shells, a first bevel gear is rotatably mounted on one side of the second bearing, and a second bevel gear is rotatably mounted on one side of the first bevel gear.

A further improvement lies in: multiple groups of second screws are movably mounted on one side of the gear seat shells, first nuts are arranged on another side of the gear seat shells, the second screws are matched with the first nuts, and second nuts are arranged on the inner sides of the gear seat shells.

A further improvement lies in: an inner hexagonal crank handle is rotatably mounted on an outer side of the first bevel gear, inner tubes are movably mounted inside the bed head/foot frame, and a pulley is fixedly mounted on one side of the inner tubes.

A further improvement lies in: the steel wire rope passes through a hole in an inner side of the screw rod sleeve and then passes through a roller on the bed head/foot frame to be inserted into the hole in the inner side respectively through round slots of the bed head/foot frame.

The disclosure has the beneficial effects: the disclosure aims to optimize the shortcomings of a conventional liftable head/foot frame, and the enterprise independently designs mold opening and replaces the conventional sliding block and the conventional bearing seat with plastic parts, to reduce the costs, optimize the structure, reduce the mounting size of the bearing seat and keep the same width as the bed head frame without occupying an additional space. The bearing seat is revised to have a double-shaft structure, which rotates more smoothly and has lower noise and longer service life. The sizes of the first bevel gear and the second bevel gear are reduced after the redesign of the gears, and a bearing is mounted in front and back of the second bevel gear respectively, such that the wear thereof can be reduced, the smoothness of rotation is improved, and noise is reduced; also, the plastic gear seat shells are produced by means of an injection molding process, internal structures are designed according to the bevel gears, and the size is precisely reduced so that the width does not exceed the width of the bed head/foot frame; a limiting device is redesigned into a spring limiting device composed of springs, outer diameters of an upper portion and a lower portion of the screw rod are decreased by optimizing an outer diameter of the screw rod, and the screw rod sleeve is revised to be integrally formed by means of injection molding; limiting is performed with two positioning tubes, the number of screw rod sleeve assemblies is decreased on the premise of achieving the same function, machining difficulty is reduced, product costs are reduced, an occupied space is smaller, and packaging is also more convenient.

BRIEF DESCRIPTION OF THE DRAWINGS

To illustrate the technical solutions in the embodiments of the disclosure or the prior art more clearly, the accompanying drawings required for the embodiments will be briefly described below. Apparently, the accompanying drawings in the following description show merely some embodiments of the disclosure, and those of ordinary skill in the art may still derive other accompanying drawings from these accompanying drawings without creative efforts.

In the figures: 1. Screw rod guide block; 2. Sleeve pin; 3. First spring; 4. Positioning tube; 5. Screw rod; 6. Screw rod sleeve; 7. Bed head/foot frame; 8. Second spring; 9. First bearing; 10. First screw; 11. Steel wire rope; 12. Gear seat shell; 13. Second bearing; 14. First bevel gear; 15. Second bevel gear; 16. Second screw; 17. First nut; 18. Second nut; 19. Inner hexagonal crank handle; 20. Inner tube.

DETAILED DESCRIPTION OF THE EMBODIMENTS

The technical solutions of embodiments will be clearly and completely described below with reference to the accompanying drawings in the embodiments of the disclosure. Apparently, the embodiments described are merely some rather than all of the embodiments of the disclosure. On the basis of the embodiments of the disclosure, all other embodiments obtained by a person of ordinary skill in the art on the premise of no creative work shall fall within the scope of protection of the disclosure.

In this description of the disclosure, it should be noted that unless otherwise explicitly specified and defined, the terms “mounting”, “connecting” and “attaching” should be understood in a broad sense, for example, they may be a fixed connection, a detachable connection, or an integrated connection, may be a mechanical connection or an electrical connection, may be a direct connection, an indirect connection by means of an intermediary, or may be an internal communication between two elements. For those of ordinary skill in the art, the specific meanings of the terms mentioned above in the disclosure should be construed according to specific circumstances.

Figure 1:
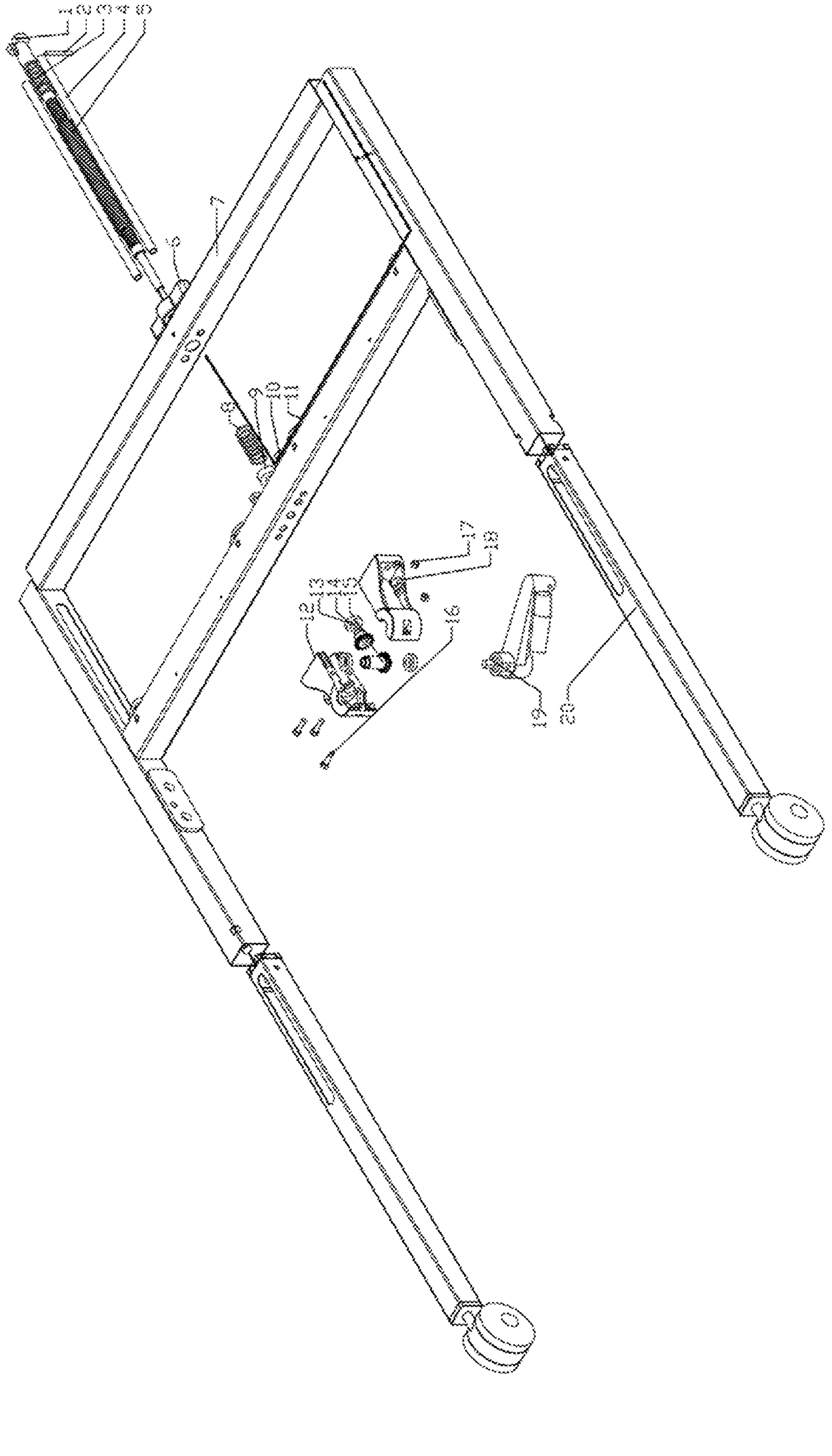
FIG. 1 is an explored view of a product of the disclosure.
Figure 2:
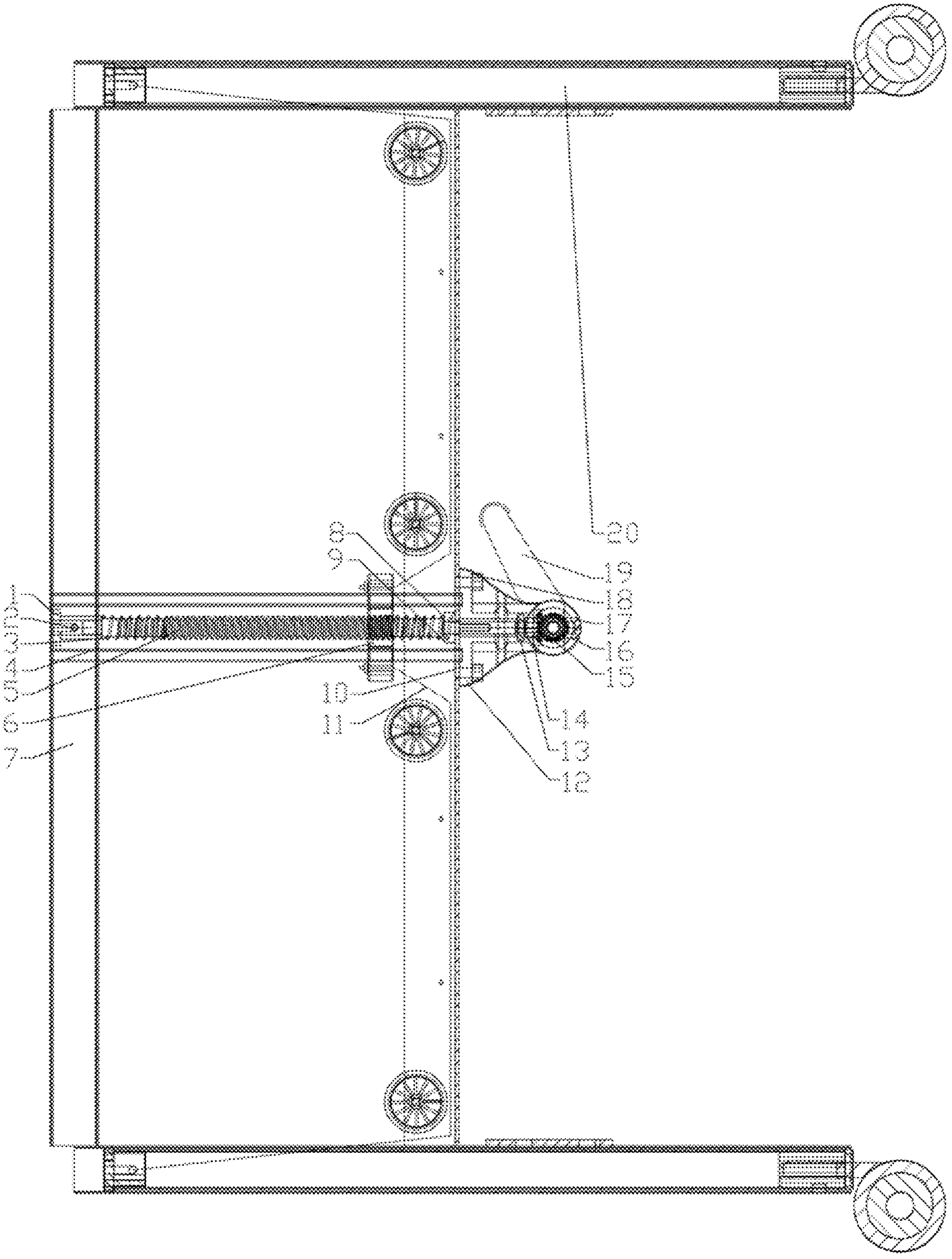
FIG. 2 is a cross-sectional view of the product of the disclosure.

As shown in FIGS. 1 and 2, this embodiment provides a raising and lowering device for a small bed head/foot frame, which includes a screw rod guide block 1, a sleeve pin 2 and a mounting assembly; the sleeve pin 2 is movably mounted on an outer side of the screw rod guide block 1, the mounting assembly is arranged on one side of the sleeve pin 2, and the entire raising and lowering device is mounted for raising and lowering operations by arranging the mounting assembly; the mounting assembly includes first springs 3, positioning tubes 4, a screw rod 5, a screw rod sleeve 6, a bed head/foot frame 7 and a second spring 8, where the first springs 3 are movably mounted at two ends of an inner side of the sleeve pin 2, and the first springs 3 are configured to perform upper buffering during an upward movement of the entire raising and lowering device; the positioning tubes 4 are fixedly mounted on two outer sides of the sleeve pin 2, and the raising and lowering device is limited during the raising and lowering operations by arranging the positioning tubes 4 to facilitate the raising and lowering operations; the screw rod 5 is rotatably mounted under the sleeve pin 2, the screw rod 5 is arranged on an inner side of the positioning tubes 4, and a support is driven to raise and lower during rotation by arranging the screw rod 5 as a main raising and lowering assembly; the screw rod sleeve 6 is mounted on an outer side of the screw rod 5 in a threaded manner, the screw rod sleeve 6 is sleeved on a surface of the screw rod 5, and the screw rod sleeve 6 is configured to cooperate with the screw rod 5 each other for the raising and lowering operations; the bed head/foot frame 7 is arranged on one side of the screw rod sleeve 6, the screw rod 5 passes through the inside of the bed head/foot frame 7 to be mutually in sleeved connection with the screw rod sleeve 6, and the bed head/foot frame 7 is configured as a main raising and lowering support; the second spring 8 is movably mounted inside the bed head/foot frame 7, and the second spring 8 is configured to perform lower buffering during the lowering of the device and to cooperate with the first springs 3 each other.

A first bearing 9 is movably mounted at the upper portion of an inner side of the bed head/foot frame 7, and the first bearing 9 is configured to cooperate with the rotation of the screw rod 5 for the raising and lowering operations, first screws 10 are fixedly mounted on two sides of the first bearing 9, and the first bearing 9 is detachably mounted by arranging the first screws 10.

A steel wire rope 11 is movably arranged on the inner side of the bed head/foot frame 7, and the steel wire rope 11 is provided at an internal snap groove in the bed head/foot frame 7.

Gear seat shells 12 are moveably mounted on two sides of the lower portion of the inner side of the bed head/foot frame 7, a second bearing 13 is arranged on inner sides of the gear seat shells 12, a first bevel gear 14 is rotatably mounted on one side of the second bearing 13, a second bevel gear 15 is rotatably mounted on one side of the first bevel gear 14, the first bevel gear 14 and the second bevel gear 15 are mounted for use by arranging the gear seat shells 12, and the raising and lowering are performed by configuring the second bearing 13 to mutually cooperate with the bearing above the second bearing.

A plurality of groups of second screws 16 are movably mounted on one side of the gear seat shells 12, first nuts 17 are arranged on the other side of the gear seat shells 12, the second screws 16 are matched with the first nuts 17, the first nuts 17 are fixed by arranging the second screws 16 to combine and mount the gear seat shells 12 on the two sides, second nuts 18 are arranged on the inner sides of the gear seat shells 12, and back sides of the gear seat shells 12 are mounted by arranging the second nuts 18.

An inner hexagonal crank handle 19 is rotatably mounted on an outer side of the first bevel gear 14, the steel wire is pulled for raising and lowering by arranging the inner hexagonal crank handle 19, inner tubes 20 are movably mounted inside the bed head/foot frame 7, a pulley is fixedly mounted on one side of the inner tubes 20, and the inner tubes 20 are raised and lowered inside the bed head/foot frame 7 for height adjustment.

The steel wire rope 11 passes through a hole in an inner side of the screw rod sleeve 6 and then passes through a roller on the bed head/foot frame 7 to be inserted into the hole in the inner side respectively through round slots of the bed head/foot frame 7.

When the raising and lowering device for a small bed head/foot frame is used, the inner hexagonal crank handle 19 is rotated to drive the second bevel gear 15 to rotate and driving the first bevel gear 14 to rotate, the first bevel gear 14 is connected to the screw rod 5 by means of two internal surfaces, the first bevel gear 14 rotates accordingly, and the screw rod 5 also rotates together therewith, thus driving the screw rod sleeve 6 to raise; one end of the steel wire rope 11 is fixed at the tops of the inner tubes 20, the other end is fixed at a hole of the screw rod sleeve 6, and when the screw rod sleeve 6 is raised as the screw rod 5 rotates, and the inner tubes 20 are lowered due to a pulling force of the steel wire rope 11, such that the bed head/foot frame 7 is raised; when the screw rod sleeve 6 is raised to the limit and the screw rod 5 is switched from a larger-diameter position to a smaller-diameter position, the first springs 3 are pressed to cause the screw rod 5 to be idle, the screw rod sleeve 6 stops raising, and accordingly the bed head/foot frame 7 also stops raising; when the inner hexagonal crank handle 19 stops rotating, the first springs 3 eject back the screw rod sleeve 6 to switch the screw rod 5 to the larger-diameter position; accordingly, when the inner hexagonal crank handle 19 is rotated in an opposite direction, the screw rod sleeve 6 is lowered to the bottom, and the screw rod 5 is switched from the larger-diameter position to the smaller-diameter position, pressing the second spring 8, such that the screw rod 5 is idling and the screw rod sleeve 6 stops lowering; when the inner hexagonal crank handle 19 stops rotating, the second spring 8 ejects back the screw rod sleeve 6 to switch the screw rod 5 to the larger-diameter position. In this way, the purpose of protecting the screw rod and the screw rod sleeve to reduce a stress thereof is achieved, so that the screw rod and the screw rod sleeve may be made of a plastic material having a lower strength; the first springs 3 are configured to perform upper buffering during the upward movement of the entire raising and lowering device, the raising and lowering device is limited during the raising and lowering operations by arranging the positioning tubes 4 to facilitate raising and lowering, and the support is driven to raise and lower during rotation by arranging the screw rod 5 as the main raising and lowering assembly; the screw rod sleeve 6 is configured to mutually cooperate with the screw rod 5 for raising and lowering operations, the bed head/foot frame 7 is configured as the main raising and lowering support, and the second spring 8 is configured to perform lower buffering during the lowering of the device and to cooperate with the first springs 3 each other, the first bearing 9 is configured to cooperate with the rotation of the screw rod 5 for raising and lowering operations, and the first bearing 9 is detachably mounted by arranging the first screws 10; the first bevel gear 14 and the second bevel gear 15 are mounted for use by arranging the gear seat shells 12, the raising and lowering operations are performed by configuring the second bearing 13 to mutually cooperate with the bearing above the second bearing, and the first nuts 17 are fixed by arranging the second screws 16 to combine and mount the gear seat shells 12 on the two side; the back sides of the gear seat shells 12 are mounted by arranging the second nuts 18, the steel wire is pulled for raising and lowering by arranging the inner hexagonal crank handle 19, and the inner tubes 20 are raised and lowered inside the bed head/foot frame 7 for height adjustment.

The above description illustrates the basic principle, main features and advantages of the disclosure. Those of ordinary skill in the art should understand that the disclosure is not limited by the above-described embodiments. The above-described embodiments and the specification only describe the principle of the disclosure. Various changes and improvements of the disclosure can further be made without departing from the spirit and scope of the disclosure, and these changes and improvements shall fall within the claimed scope of protection of the disclosure. The claimed scope of protection of the disclosure is defined by the append claims and their equivalents.

What is claimed is:

1. A raising and lowering device for a bed head/foot frame, comprising a screw rod guide block (1), a sleeve pin (2) and a mounting assembly, wherein the sleeve pin (2) is movably mounted on an outer side of the screw rod guide block (1), the mounting assembly is arranged on one side of the sleeve pin (2), and the entire raising and lowering device is mounted for raising and lowering operations by arranging the mounting assembly; the mounting assembly comprises first springs (3), positioning tubes (4), a screw rod (5), a screw rod sleeve (6), a bed head/foot frame (7) and a second spring (8); the first springs (3) are movably mounted at two ends of an inner side of the sleeve pin (2), the positioning tubes (4) are fixedly mounted on two outer sides of the sleeve pin (2), and the screw rod (5) is rotatably mounted under the sleeve pin (2); the screw rod sleeve (6) is mounted on an outer side of the screw rod (5) in a threaded manner, the bed head/foot frame (7) is arranged on one side of the screw rod sleeve (6), and the second spring (8) is mounted inside the bed head/foot frame (7).

2. The raising and lowering device for a bed head/foot frame according to claim 1, wherein a first bearing (9) is movably mounted at the upper portion of an inner side of the bed head/foot frame (7), and first screws (10) are fixedly mounted on two sides of the first bearing (9).

3. The raising and lowering device for a bed head/foot frame according to claim 1, wherein a steel wire rope (11) is movably arranged on the inner side of the bed head/foot frame (7), and the steel wire rope (11) is provided at an internal snap groove in the bed head/foot frame (7).

4. The raising and lowering device for a bed head/foot frame according to claim 1, wherein gear seat shells (12) are moveably mounted on two sides of the lower portion of the inner side of the bed head/foot frame (7), a second bearing (13) is arranged on inner sides of the gear seat shells (12), a first bevel gear (14) is rotatably mounted on one side of the second bearing (13), and a second bevel gear (15) is rotatably mounted on one side of the first bevel gear (14).

5. The raising and lowering device for a bed head/foot frame according to claim 4, wherein a plurality of groups of second screws (16) are movably mounted on one side of the gear seat shells (12), first nuts (17) are arranged on another side of the gear seat shells (12), the second screws (16) are matched with the first nuts (17), and second nuts (18) are arranged on the inner sides of the gear seat shells (12).

6. The raising and lowering device for a bed head/foot frame according to claim 4, wherein an inner hexagonal crank handle (19) is rotatably mounted on an outer side of the first bevel gear (14), inner tubes (20) are movably mounted inside the bed head/foot frame (7), and a pulley is fixedly mounted on one side of the inner tubes (20).

7. The raising and lowering device for a bed head/foot frame according to claim 3, wherein the steel wire rope (11)

passes through a hole in an inner side of the screw rod sleeve (6) and then passes through a roller on the bed head/foot frame (7) to be inserted into the hole in the inner side respectively through round slots of the bed head/foot frame (7).

* * * * *